Figure 1:
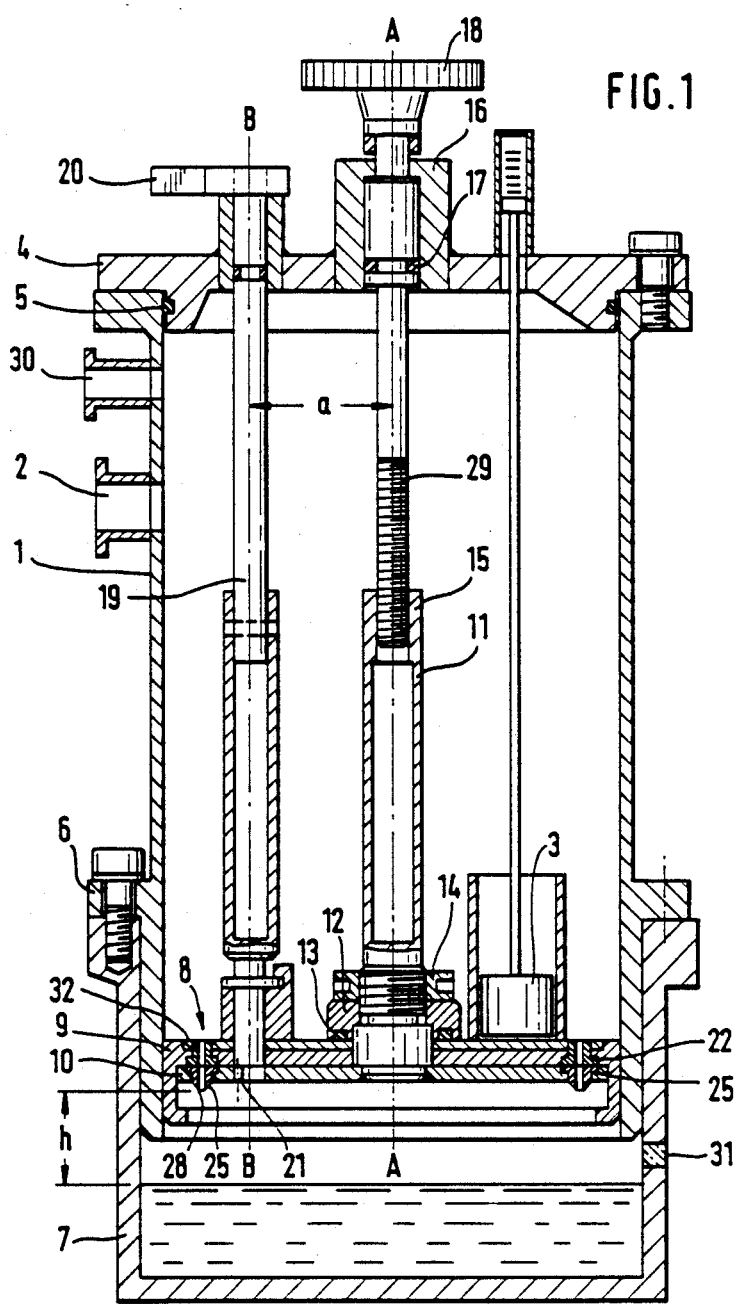

United States Patent [19]

Sporri

[11] Patent Number: 4,967,571
[45] Date of Patent: Nov. 6, 1990

[54] DEVICE FOR THE CRYOGENIC PELLETIZATION OF LIQUIDS

[75] Inventor: Hans P. Sporri, Holstein, Switzerland

[73] Assignee: Messer. Griesheim GmbH, Fed. Rep. of Germany

[21] Appl. No.: 407,533

[22] Filed: Sep. 15, 1989

[30] Foreign Application Priority Data

Sep. 16, 1988 [CH] Switzerland .................. 03473/88

[51] Int. Cl.$^5$ ............................................. F25D 17/02
[52] U.S. Cl. .......................................... 62/373; 62/64
[58] Field of Search ............................ 62/64, 78, 373

[56] References Cited

U.S. PATENT DOCUMENTS 3,228,838  1/1966  Rinfret et al. ...................... 62/78
4,704,873  11/1987  Imaike et al. ....................... 62/64

*Primary Examiner*—Ronald C. Capossela
*Attorney, Agent, or Firm*—Connolly and Hutz

[57] ABSTRACT

In a device for the cryogenic pelletization of liquids by dripping the liquids into a coolant having a temperature sufficiently cold to solidify the drops, said device including a liquid container mounted above a coolant reservoir, a dripping unit at the bottom of said container, said dripping unit including an inner disk disposed toward the interior of said container, an outer disk against said inner disk, said outer disk being disposed toward said coolant reservoir, flow openings in said inner and outer disks alignable with each other to permit liquid reservoir, means for rotating one of said disks with respect to the other of said disks to adjust the effective size of said flow openings by adjusting their degree of alignment, the improvement being in that nozzle-like drip-off elements being mounted in said flow openings of said outer disk, and said elements being detachably mounted to comprise replaceable insert elements.

8 Claims, 2 Drawing Sheets

DEVICE FOR THE CRYOGENIC PELLETIZATION OF LIQUIDS

The invention relates to a device for the cryogenic pelletization of liquids by dripping them into a coolant which has a temperature that is sufficiently cold to cryogenically solidify the drops, according to the generic part of claim 1.

Cryogenic pelletization serves to quickly freeze liquids or viscous materials such as, for example, sensitive liquids containing organic components as well as solutions and suspensions of the kind used especially in biotechnology and in the food and chemical-pharmaceutical industries. Freezing sensitive liquids must be done as quickly and as uniformly as possible in order to prevent freezing damage from occurring to the product. This applies in particular to bacteria suspensions. If the cryogenic process is carried out too slowly, the cell walls and the cell tissue of the bacteria could be damaged as a result of too strong a formation of ice crystals, and this would reduce the survival rate of these cells to an inadmissibly low level.

The freezing process is carried out by dripping the liquids into a liquid coolant such as, for example, nitrogen. The prerequisite for a gentle treatment of the products in the coolant is that the dripping volume must remain constant and the form of the drops must be uniform, so that the retention time in the coolant can be kept as short as possible, while all of the drops freeze the whole way through. A process control system ensures a uniform, minimum retention time of the drops in the coolant. After that, all of the drops in the coolant should be completely frozen and the frozen granulate thus formed can then be removed from the coolant, for example, automatically.

According to an earlier proposal, a special dripping device is meant to ensure optimally shaped drops when the liquid enters the coolant as well as uniformly sized drops, thus fulfilling the prescribed conditions. In accordance with this earlier proposal, the drops are formed on a dripping plate which consists, for instance, of the base of a container holding the product to be processed. The dripping plate has nozzle-like openings which allow the liquid product to emerge into a gas atmosphere or into a slight vacuum as a result of its intrinsic static pressure or of an external source of pressure. The dripping plate is positioned at a certain critical height above the surface of the coolant located beneath it.

The shape of the drops is influenced, on the one hand, by the outlet edge of the nozzles and, on the other hand, by the height of the dripping plate above the surface of the coolant. If, for example, the drop breaking away from the nozzle outlet falls from too great a height and hits the surface of the coolant too strongly, the shape of the drop changes uncontrollably, or else, the drop breaks into several droplets of different sizes. Moreover, it has been found that the surface properties of the material, at least in the area of the nozzle outlet, also play a role in the dripping behavior. These properties have to do with the surface tension of the individual product to be processed. For this reason, it is desirable to set the processing parameters individually for each specific product being processed and to ensure that these values are precisely observed. This is not possible to a satisfactory degree with the devices for cryogenic pelletization known so far.

The task of the present invention is to create a device of the type defined above, which allows the manufacture of a product having as uniform a quality as possible with varying process parameters, so that the production yield is improved, even when batches are changed.

This task is solved according to the invention by means of the features defined in claim 1.

The claimed solution allows a very flexible setting and easy variation of the most important process parameters, so that drop size, drop shape and dripping height can be easily adjusted to the desired values and reliably reproduced, thus making it possible to manufacture the frozen product to have the desired quality and uniformity. In this manner, the yield can be markedly improved which, in turn increases the profitability of the process, especially in the case of highly sensitive products. Defective batches can be virtually eliminated.

In the case of batches of different products, various nozzle elements made of a suitable material and having appropriate nozzle diameters and dripping edges can be used. It is even possible to temporarily equip individual sectors of the dripping unit with different nozzle elements in order to ascertain the ideal nozzle size and nozzle shape for new product batches whose behavior is not yet known. In some cases, this means that there is need to perform preliminary experiments in test units operated exclusively for this purpose. Through brief retooling, the normal production unit can be used for this purpose before actual production is started up.

Figure 2:
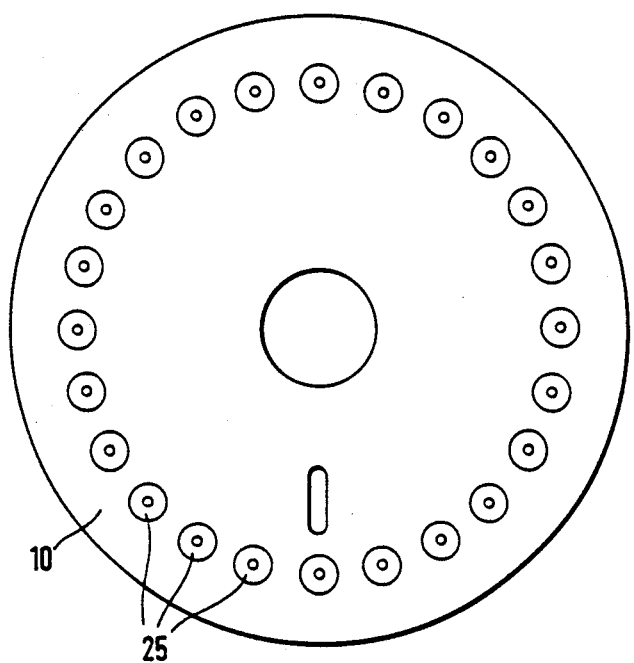
Figure 3:
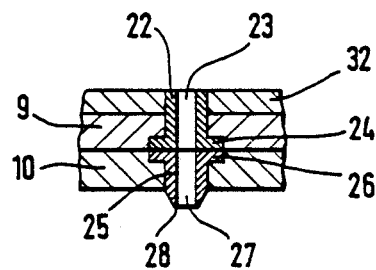

The description below contains additional advantages of the invention and gives further details concerning the invention with reference to preferred embodiments and the drawings. They show the following:

FIG. 1: schematic cross section of a liquid container positioned above a coolant bath and having a dripping unit in the lower section of the container, FIG. 2: the example of a dripping disk, shown from a top view, and FIG. 3: an enlarged illustration of the dripping disk with the nozzle elements in place.

The freezing device according to FIG. 1 consists of a container 1, which is filled with the liquid or paste-like product to be processed. FIG. 1 shows the example of a cylindrical container, whose axis is indicated as A—A. The filling step is carried out by means of a process control operation which fills the container up to a certain level. Filling is done via a feed opening 2. The filling level in the container is monitored by a level indicator 3, which reacts, for instance, to a minimum and to a maximum limit value, thus activating a refilling step when the lower limit value has been reached, and switching it off again when the upper filling level has been reached.

The upper part of container 1 is sealed by a lid 4, which contains two setting mechanisms for the fine adjustment of the process parameters and which is described in greater detail below. The lid is tightly screwed onto container 1, with a seal 5 between the lid and the container. The lower part of container 1 rests on the holding fixture of a coolant container 7 with a flange 6.

The bottom surface of the base of container 1 is closed by a dripping unit 8 which, in essence, consists of two disks 9 and 10 positioned one on top of the other. In the example at hand, both disks are arranged centrically to the cylinder axis A—A. Disk 9 facing the inside of the container serves as the actual bottom of the container, against which disk 10 facing the outside of the container can be rotated around the cylinder axis A—A. For this purpose, the outer disk 10 is attached, for example, by means of welding, to a central tube 11. A flange ring 12 affixed to the central tube is positioned against the inner disk 9 by means of an O-ring 13, and the flange ring presses this disk against the outer disk 10 as a result of the pressure exerted by a ring nut 14. By rotating one disk relative to the other, it is possible to change the effective cross-section of the openings in the nozzle elements which are installed in disks 9 and 10, and which will be described later.

Central tube 11 has a threaded section 15 through which a central threaded bolt 29 runs. This threaded bolt 29 is led to the outside through a guide 16 located in lid 4 with a seal 17 between the lid and the bolt, and the threaded bolt 29 is equipped with actuating mechanism 18. This mechanism can be a manual wheel or a controlled motor drive. This makes it possible to precisely vary the height of the container bottom, which consists of the inner disk 9 and the outer disk 10 positioned one on top of the other. The height is varied relative to the wall of container 1, and thus relative to the coolant container 7 located beneath it.

A second adjustment axis 19 runs from lid 4 parallel to the cylinder axis A—A, and it is radially at a distance from the cylinder axis by an interval a. The rotation ensuing from a second actuating mechanism 20 is transmitted to an eccentric 21 located at the lower end of the adjustment axis 19. The rotting axis of the eccentrics runs on bearings in the inner disk 9, while the point of force of the eccentric lies in the outer disk. This makes it possible to adjust the outer disk 10 by rotating it at small increments relative to the inner disk 9 around the central axis A—A of the container 1.

The inner disk 9 is equipped with nozzle-inlet elements 22 which have a nozzle borehole 23 as well as a flange-like enlargement 24 on the side facing the outer disk. In the case of the example shown here, the nozzle-inlet elements 22 are installed in the disk 9 in such a manner that they can easily be replaced.

In a similar manner, disk 10 is equipped with replaceable nozzle-like drip-off elements 25, which have flange-like enlargements 26 on the side facing inner disk 9. The flange-like enlargements 26 of the drip-off elements work together with the enlargements 24 of the nozzle-inlet elements 22. The nozzle elements are held in the disks by disks 9 and 10 positioned one on top of the other.

The drip-off element 25 has a drip-off nozzle borehole 27 as well as a specially designed drip-off edge 28 in its bottom end. The shape of the drip-off edge can be designed in various ways, depending on the product to be processed. The optimal shape for each product can be ascertained by experiments, so as to ensure that the liquid drops break away from the nozzle element uniformly and constantly under the given conditions. It is also possible to optimize by means of experiments the effect of surface tension by selecting various materials for the drip-off elements.

FIG. 2 shows that there are additional nozzle-inlet elements on the inner disk 9, and that there are additional drip-off elements on the outer disk 10, in a circle at a certain radius around the center of the disks, in the example given here. Together, each pair consisting of a nozzle-inlet element and a drip-off element constitutes an adjustable nozzle, whereby the effective nozzle opening is varied at the same time for all of the nozzles by means of the eccentric 21 which, in turn, can be adjusted by means of the second actuating mechanism 19. In this manner, the flow volume can be set at the desired values.

The nozzle-inlet elements 22 and the drip-off elements 25 are preferably made of stainless steel or of a suitable plastic compound. The choice of the material depends, on the one hand, on its compatibility with the product to be processed and, on the other hand, on the above-mentioned ideal surface properties, which play a decisive role in controlling the way the drops break away from the nozzle.

The liquid or paste-like compound, which has been filled to a certain level in liquid container 1, is pressed through the combined nozzle elements on the bottom of the container as a result of the intrinsic static pressure or by subjecting the container to a pressure medium. By properly selecting the shape of the drip-off edges as well as by setting the effective nozzle openings and the drip-off height h (measured from the surface of the coolant bath), it is possible to ensure that the drops forming on the drip-off edge 28 leave the nozzle regularly and with a constant shape. Effective nozzle openings of, for example, between 0.7 mm and 2.0 mm, have proven to be advantageous for slightly viscous compounds.

If the optimal values are not yet known, they can be determined in preliminary experiments for which, in addition to the production process, the described device is especially well suited. For this purpose, instead of drip-off elements all having the same diameter, various areas, for example, various sectors of the outer disk are equipped with drip-off elements having graduated diameters or drip-off edges with various shapes. It is also possible to use different materials for the drip-off elements side by side. During such a selection procedure, the various shapes of the drops are observed, for instance, through an inspection opening 31 in the wall of the coolant container 7, so that it is possible to easily select the optimal nozzles for the new product to be processed in the next production run. The optimal values thus determined can be stored for subsequent production runs in a process-control unit connected to the device.

In order to ensure proper functioning of the drip-off elements in the case of continuous operation, the bottom of the container has a heating unit 32, because of the coolant located beneath it. With this heating unit, the area around the drip-off elements can be kept at a temperature that is slightly higher than the solidification temperature of the product to be processed.

Basically, container 1 can have any desired shape. The cylindrical shape is advantageous for processing sterile products, especially when hot-air sterilization is employed. The hot air is fed almost tangentially into the container via a hot-air inlet 30 designed for this purpose, as a result of which, facilitated by the cylindrical shape of the container walls, the hot air circulates thoroughly so that all parts of the inner chamber are reached by the hot air. The nozzle openings are also exposed to the current of sterilizing hot air.

I claim:

1. In a device for the cryogenic pelletization of liquids by dripping the liquids into a coolant having a temperature sufficiently cold to solidify the drops, said device including a liquid container mounted above a coolant reservoir, a dripping unit at the bottom of said container, said dripping unit including an inner disk disposed toward the interior of said container, an outer disk against said inner disk, said outer disk being disposed toward said coolant reservoir, flow openings in said inner and outer disks alignable with each other to permit liquid to flow from said container through said disks and into said reservoir, means for rotating one of said disks with respect to the other of said disks to adjust the effective size of said flow openings by adjusting their degree of alignment, the improvement being in that nozzle-like drip-off elements being mounted in said flow openings of said outer disk, and said elements being detachably mounted to comprise replaceable insert elements.

2. Device according to claim 1, characterized in that said drip-off element installed in said outer disk effectively corresponds with nozzle-inlet elements mounted in said flow openings in said inner drip disk.

3. Device according to claim 2, characterized in that said nozzle-inlet elements and said drip-off elements have flange-like enlargements in the area where they come into contact with each other.

4. Device according to claim 1, characterized in that said liquid container is designed as a circular cylinder, and said outer disk being rotatable around the cylinder axis of said liquid container.

5. Device according to claims 2 or 4, characterized in that said corresponding nozzle elements are arranged in a circle around said cylinder axis on said disks.

6. Device according to claim 4, characterized in that the setting of said outer disk is done by means of an eccentric device whose axis runs parallel to said cylinder axis and spaced at an interval from said cylinder axis.

7. Device according to claims 2 or 4, characterized in that the height of said inner disk and of said outer disk is adjustable within the cylindrical container wall by means of a setting mechanism, whereby the height of said drop-off elements to the surface of the coolant in said reservoir can be varied.

8. Device according to claim 1, characterized in that said drip disks can be heated by means of a heating unit.

* * * * *